United States Patent [19]
Meier

[11] Patent Number: 5,660,518
[45] Date of Patent: Aug. 26, 1997

[54] VARIABLE PITCH DOLLY APPARATUS

[76] Inventor: James W. Meier, 2538 W. Townley Ave., Phoenix, Ariz. 85021

[21] Appl. No.: 376,822

[22] Filed: Jan. 23, 1995

[51] Int. Cl.⁶ .................................................. B60P 1/02
[52] U.S. Cl. ........................ 414/458; 254/108; 254/8 R; 414/589; 414/10; 180/41
[58] Field of Search .................................. 414/458, 495, 414/459, 460, 461, 589, 590, 541, 540, 10; 180/41; 254/2 R, 8 R, 2 C, 14, 108, 418, 105

[56] References Cited

U.S. PATENT DOCUMENTS

| | | | |
|---|---|---|---|
| 2,450,690 | 10/1948 | Robins | 414/458 |
| 2,931,519 | 4/1960 | Beach | 414/589 |
| 3,010,592 | 11/1961 | Chadwick | 414/458 |
| 3,286,986 | 11/1966 | Blankenship | 414/458 X |
| 3,327,996 | 6/1967 | Morse | 414/458 |
| 3,370,725 | 2/1968 | Jones | 414/458 |
| 3,486,650 | 12/1969 | Boone | 414/458 |
| 3,768,676 | 10/1973 | Spitzer | 414/459 |
| 4,516,901 | 5/1985 | Riedl | 414/458 |

FOREIGN PATENT DOCUMENTS

| | | | |
|---|---|---|---|
| 2458505 | 2/1981 | France | 414/458 |
| 2205495 | 8/1973 | Germany | 414/458 |

*Primary Examiner*—Frank E. Werner
*Attorney, Agent, or Firm*—H. Gordon Shields

[57] ABSTRACT

Dolly apparatus for hauling loads on a pitched surface includes frame structure secured to wheels, with the wheels being adjustable in height so that the dolly may be moved along a pitched surface with the load maintained in a proper horizontal orientation. Different embodiments are disclosed, which embodiments may be used for different types of loads. One embodiment is a relatively simple embodiment which may be used for a relatively light load, and a second embodiment is a relatively complicated embodiment which may be used to transport heavier loads. The second embodiment includes wheels which may be oriented ninety degrees for moving in two directions, for example for moving a load to a specific location in one direction and then moving it in a second direction for specifically positioning the load.

14 Claims, 4 Drawing Sheets

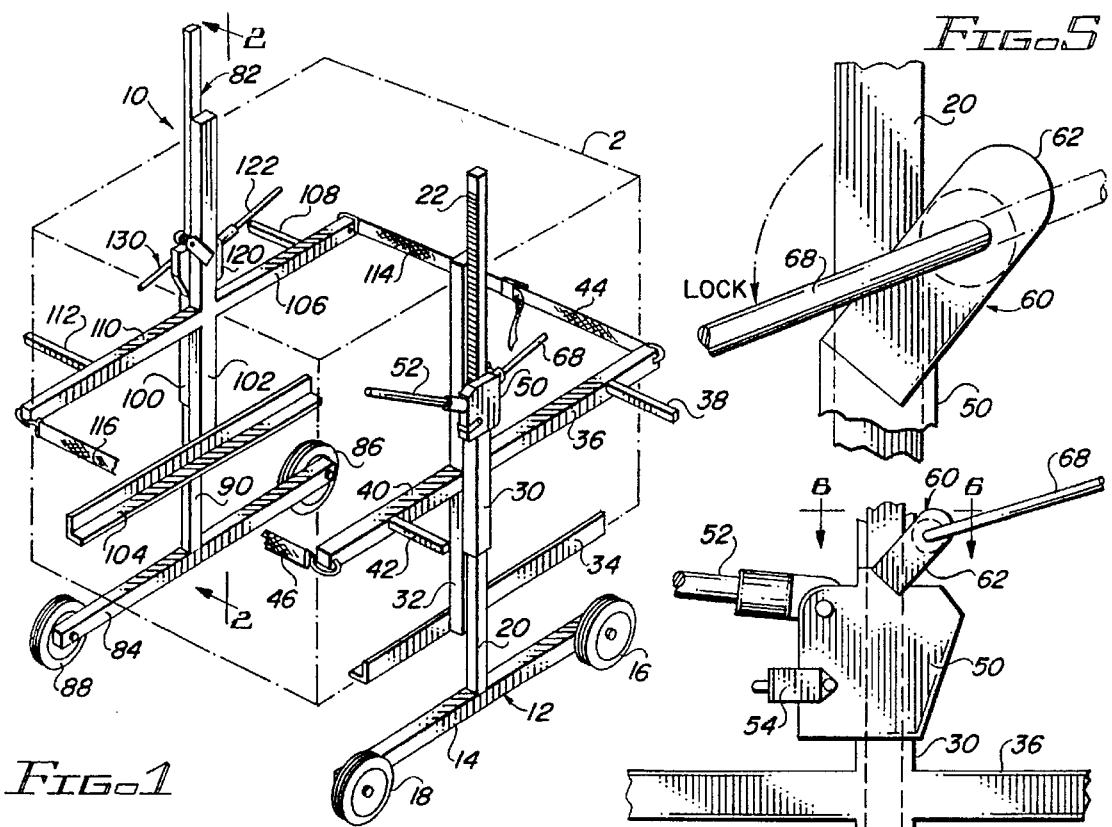
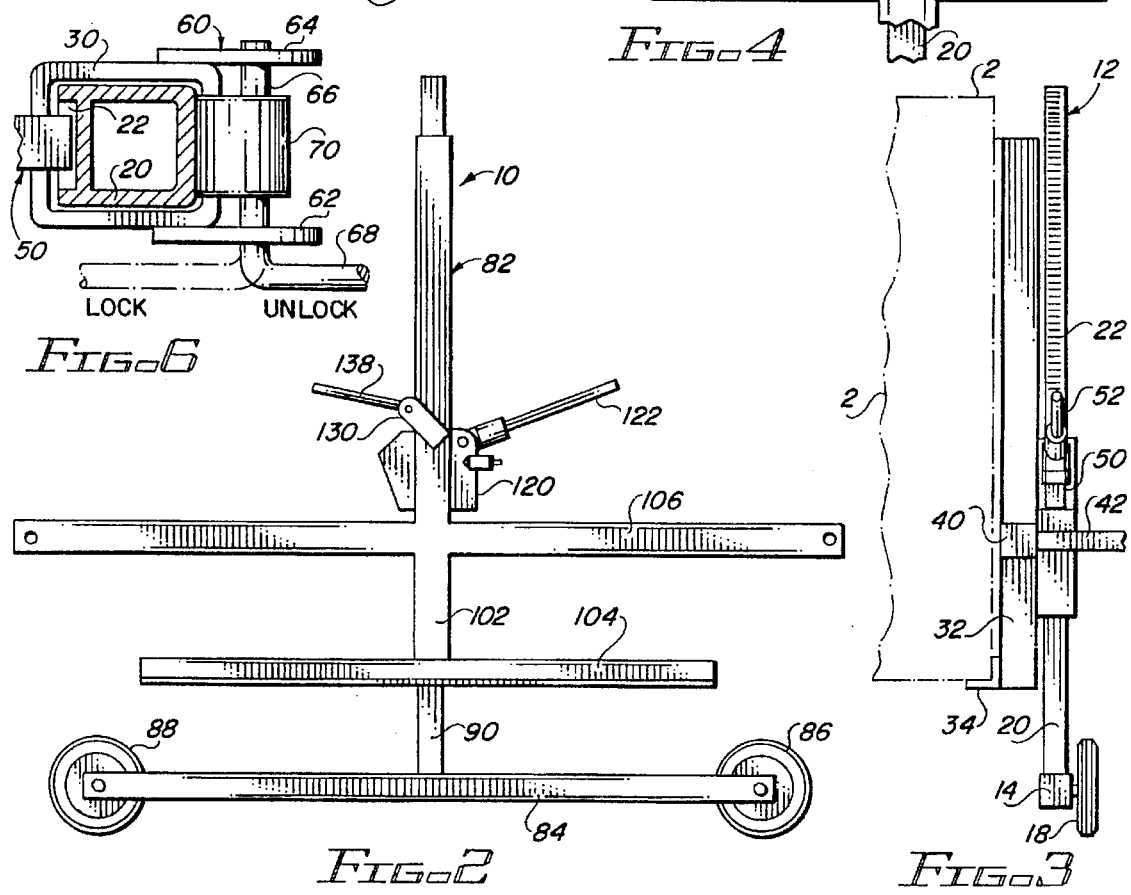

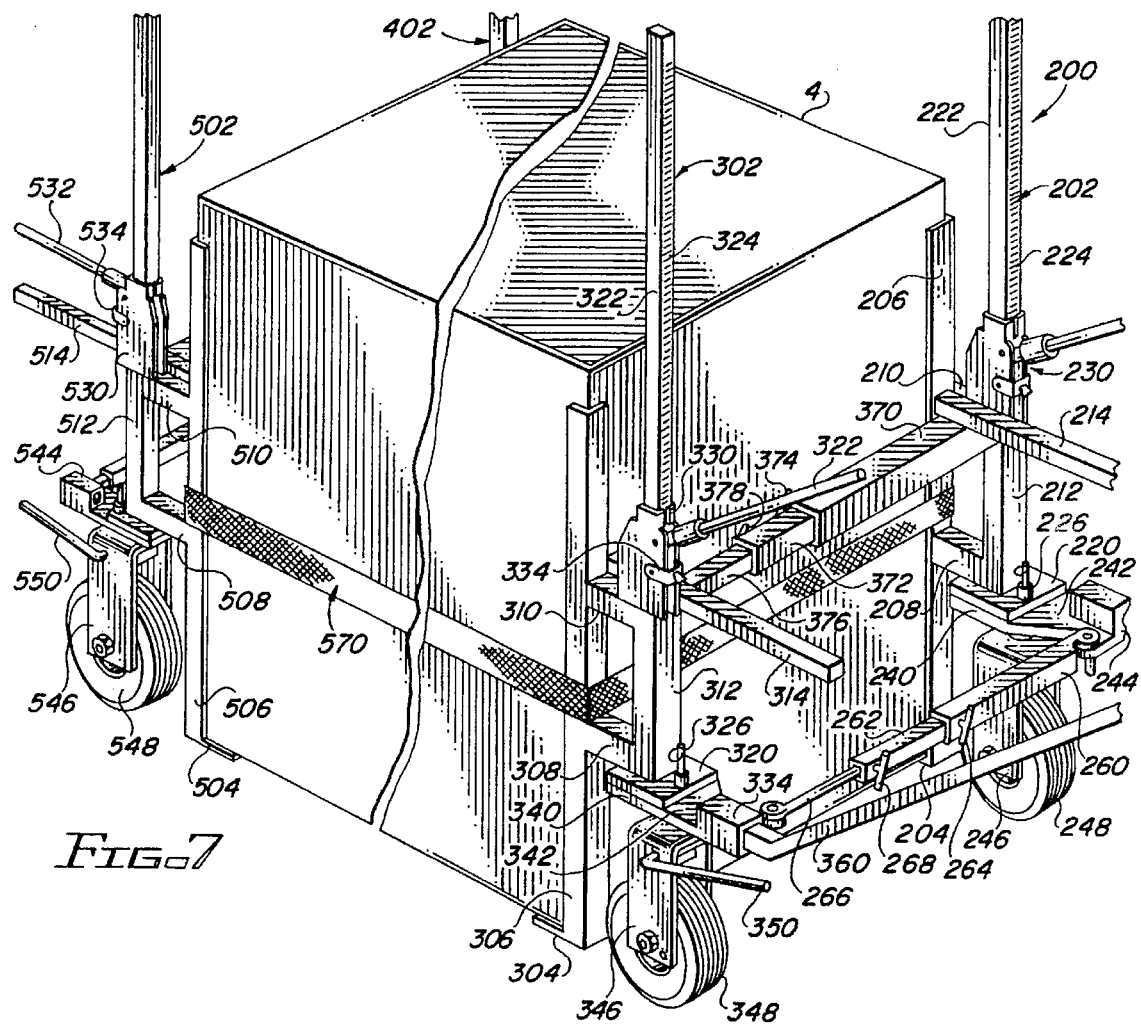

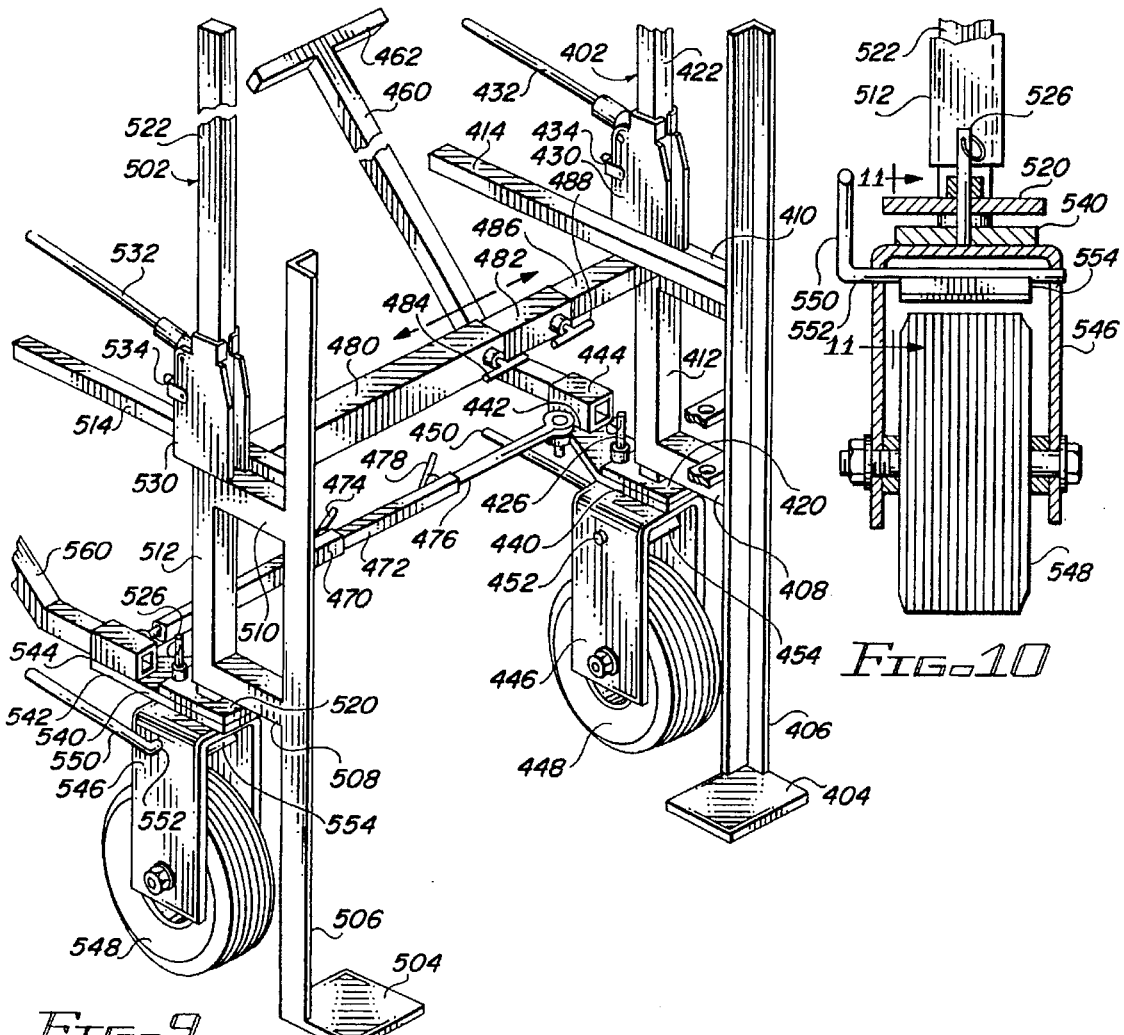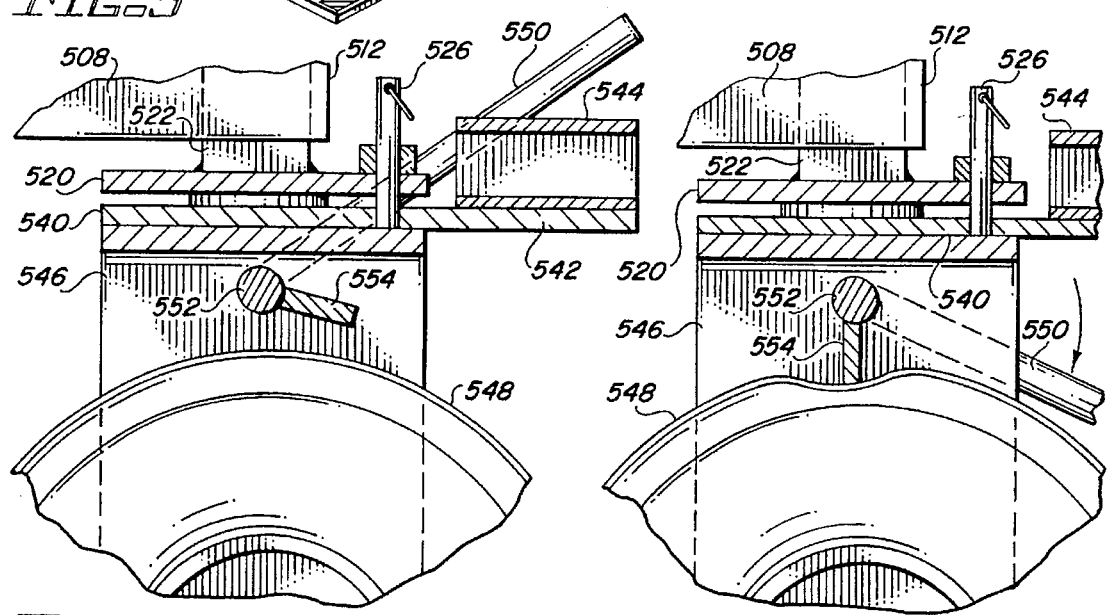

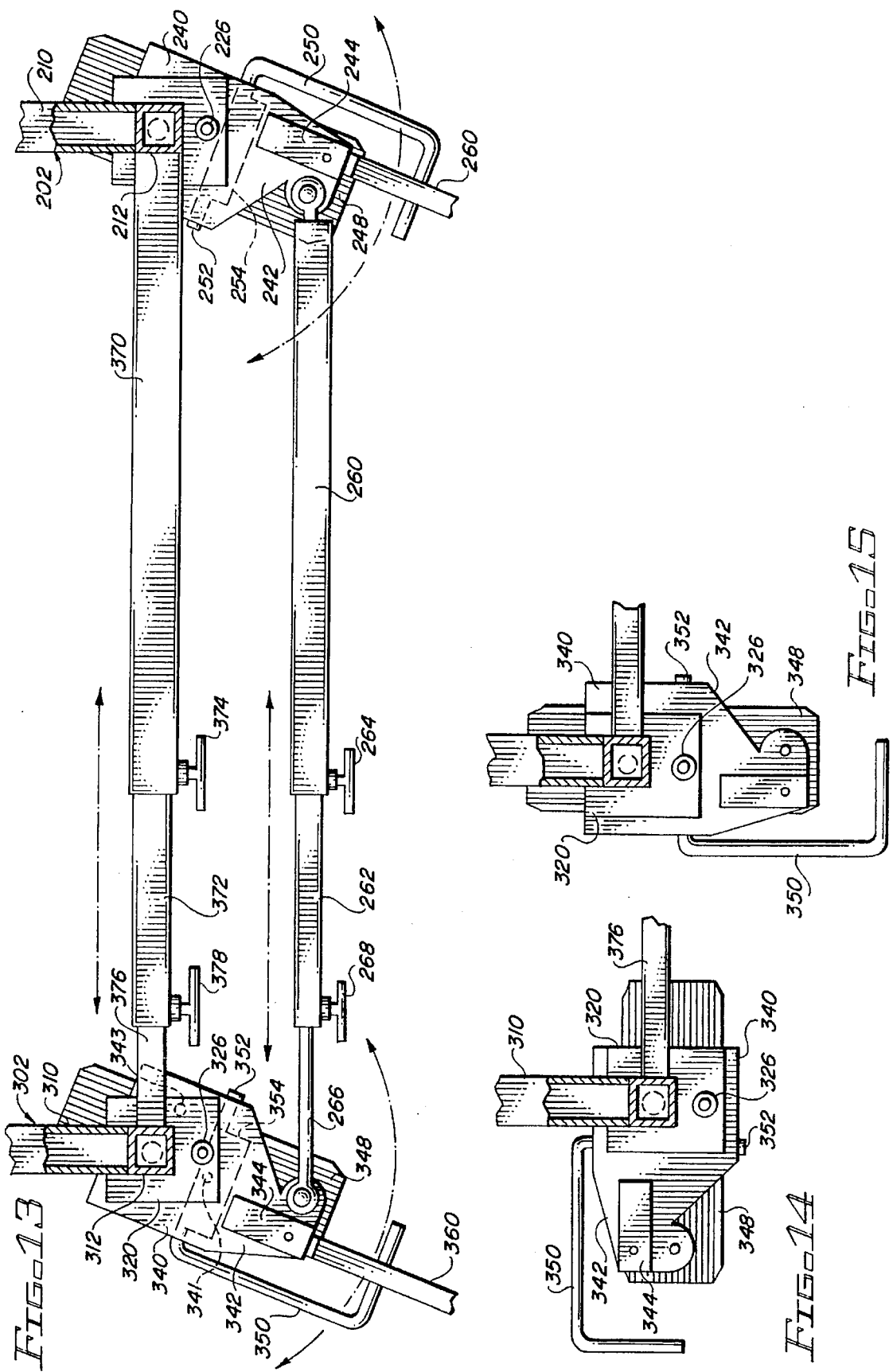

5,660,518

VARIABLE PITCH DOLLY APPARATUS

BACKGROUND OF THE INVENTION

1. Field of the Invention

This invention relates to dollies, and, more particularly, to variable pitch dolly apparatus for moving heavy equipment on a pitched surface, such as a pitched roof.

2. Description of the Prior Art

While dollies of various types and designs have been used to move heavy equipment on the ground, or on level surfaces, the use of dollies on pitched roofs has, to the knowledge of the inventor, not been accomplished. The apparatus of the present invention accordingly is designed to overcome the deficiency of the prior art by providing dolly apparatus usable on pitched surfaces, such as pitched roofs, for hauling relatively heavy equipment, such as heating, ventilating, and air conditioning elements.

SUMMARY OF THE INVENTION

The invention described and claimed herein comprises embodiments of dolly apparatus having load support elements of adjustable heights suitable for moving a load in a level condition on various pitched roofs.

Among the objects of the present invention are the following:

To provide new and useful dolly apparatus;

To provide new and useful dolly apparatus for use on pitched surfaces;

To provide new and useful dolly apparatus capable of varying the height of dolly elements to maintain a load in a level orientation or condition while moving on a pitched surface;

To provide new and useful dolly apparatus for moving a load in two directions on a pitched roof; and To provide new and useful dolly apparatus having adjustable height load support elements to compensate for a plurality of roof pitches.

BRIEF DESCRIPTION OF THE DRAWING

FIG. 1 is a perspective view of dolly apparatus of the present invention.

FIG. 2 is a side view of a portion of the apparatus of FIG. 1 taken generally along line 2—2 of FIG. 1.

FIG. 3 is an end view of a portion of the apparatus of the present invention.

FIG. 4 is an enlarged view of another portion of the apparatus of the present invention.

FIG. 5 is an enlarged view of a portion of the apparatus illustrated in FIG. 4 and sequentially following FIG. 4.

FIG. 6 is an enlarged view in partial section taken generally along line 6—6 of FIG. 4.

FIG. 7 is a perspective view of an alternate embodiment of the apparatus of FIG. 1.

FIG. 8 is a side view of the apparatus of FIG. 7.

FIG. 9 is a perspective view of a portion of the apparatus of FIG. 7.

FIG. 10 is an enlarged front view of a portion of the apparatus of FIG. 9.

FIG. 11 is an enlarged view in partial section taken generally along line 11—11 of FIG. 10.

FIG. 12 is an enlarged view of the apparatus of FIG. 11 sequentially following FIG. 11.

FIG. 13 is a top view of a portion of the apparatus of FIG. 7.

FIG. 14 is an enlarged view of a portion of the apparatus of FIG. 13 sequentially following FIG. 13.

FIG. 15 is an enlarged view of a portion of the apparatus of FIG. 13 sequentially following FIG. 14.

DESCRIPTION OF THE PREFERRED EMBODIMENT

FIG. 1 is a perspective view of dolly apparatus 10 of the present invention. The dolly apparatus 10 is preferably used for relatively lightweight, but bulky, items, such as evaporative coolers. The dolly apparatus 10 includes two units, a first dolly unit 12 and a second dolly unit 82. The two units 12 and 82 are substantially identical.

FIG. 2 is a side view of the dolly unit 82 taken generally along line 2—2 of FIG. 1. FIG. 3 is an end view of the dolly unit 12.

FIG. 4 is an enlarged side view of a portion of the dolly unit 12 illustrating the operation of a portion thereof. FIG. 5 is a view of a portion of the apparatus of FIG. 4, sequentially following the illustration of FIG. 4. Both FIGS. 4 and 5 illustrate elements associated with a safety lock or brake assembly.

FIG. 6 is a view in partial section taken generally along line 6—6 of FIG. 4, illustrating some of the elements involved with the brake structure.

Referring primarily to FIG. 1, the first dolly unit or section 12 includes a base 14 to which are secured wheels 16 and 18. The base element 14 is preferably of square steel tubing.

Extending upwardly from the base unit 14 is a rectangularly configured fixed post 20. The fixed post 20 is also preferably square tubing, and is appropriately secured, as by welding, to the base element 14.

The post 12, upwardly from the base 14, includes a plurality of ratchet elements 22.

A sleeve 30 is disposed over the post 20, and is movable thereon by ratchet action. The sleeve 30 is held to the post 20, and is moved thereon, by a ratchet assembly 50. This will be discussed in more detail below.

Secured to the sleeve 30, and movable therewith, is a movable post 32. The post 32 is appropriately secured, as be welding, to the sleeve 30.

Secured to the bottom of the post 32 is a load support bracket 32. The load support bracket 34 is preferably merely a length of angle iron appropriately secured, again as by welding, to the lower portion of the movable post 32.

Generally parallel to the load support element 34, and spaced upwardly therefrom, are two arms 36 and 40. The arms 36 and 40 are aligned with each other and are secured to the sides of the post 32. The post 32 is preferably square steel tubing, and the, arms 36 and 40 are preferably of similar construction.

While the load support 34 is secured to the side or front face of the post 32, the arms 36 and 40 are secured to the sides. The arms 36 and 40 are accordingly not aligned with the load support 34. This is best shown in FIG. 3, which comprises an end view of the dolly unit 12. This construction may also be understood from FIGS. 1 and 2.

Handles 38 and 42 extend outwardly from the arms 36 and 40, respectively. The handles 38 and 40 are parallel to each other and are generally perpendicular to the length or longitudinal axis of the arms 36 and 40. A pair of straps 44 and 46 are appropriately secured to the outer ends of the arms 36 and 40, respectively. The straps 44 and 46 help to secure a relatively bulky load 2 to the dolly apparatus 10. The load 2 is shown in both FIGS. 1 and 3 in dash dot lines.

As indicated above, the sleeve 30, and the post 32, with a load 2 secured thereto, moves relative to the base 14 and the fixed post 20 by means of a ratchet assembly 50. The ratchet assembly 50 is simply a well known ratchet assembly, substantially the same as that typically used for automotive bumper jacks. A switch or lever 54 is used to determine whether the ratchet assembly 50 will move upwardly or downwardly on the fixed post 20 in response to movement of a handle 52.

A lock assembly 60 is used to help secure the sleeve 30 and its associated elements to the post 20. The lock assembly 60 will be discussed in detail below in conjunction with FIGS. 4, 5, and 6.

The second dolly unit or section 82 is substantially identical to the first dolly unit or section 12. Details of the dolly unit 82 are shown in FIGS. 1 and 2. The second unit 82 includes a base 84 to which are appropriately secured and journaled for rotation a pair of wheels 86 and 88. A fixed post 90 is appropriately secured to, and extends upwardly from, the base element 84. The elements 84 and 90 are both preferably square steel tubing, and are appropriately welded together.

A plurality of ratchet elements 92 are disposed in the post 90.

A sleeve 100 is disposed over the post 90 and is movable thereon. A movable post 102 is in turn secured to the sleeve 100. The post 102 is preferably secured, as by welding, to the sleeve 100.

At the bottom of the post 102 is a load support element 104. Spaced upwardly along the post 102 from the load support element 104 are two outwardly extending arms, including an arm 106 and an arm 110. Handles 108 and 112 extend outwardly from, and are appropriately secured to, the arms 106 and 110, respectively.

Straps 114 and 116 are secured to the outer ends of the arms 106 and 110, respectively. The strap 114 is appropriately connected to the strap 44, and the strap 116 is appropriately connected to the strap 46. The straps 44, 114, and 46, 116 are then used to secure the load 2 to the dolly apparatus 10. The straps 44, 114 and 46, 116 essentially tie the two dolly units 12 and 82 together. The straps accordingly provide a dual function.

The sleeve 100 with its post 102, and with the load 2 secured thereto, move on the post 90 through a ratchet assembly 120. The ratchet assembly 120 includes a handle 122. A lock assembly 130 is used to lock the sleeve 100 to the post 90. The ratchet assembly 120 is substantially identical to the ratchet assembly 50, and the lock assembly 130 is substantially identical to the lock assembly 60.

The operation of the locks 60 and 130 may best be understood by reference to FIGS. 4, 5, and 6. The lock assembly 60 is shown in operational detail in FIGS. 4, 5, and 6. Reference accordingly will be made primarily to those Figures for the following discussion.

The lock assembly 60 includes a pair of plates 62 and 64 which are appropriately secured, as by welding, to the sleeve 30. A pin or brake rod 66 extends through the plates 62 and 64. A handle 68 is in turn secured to the pin or rod 66. An eccentric lock element 70 is appropriately secured to the pin or rod 66.

Movement of the handle 68 from the position shown in FIG. 4 to the position shown in FIG. 5 moves the eccentric lock element 70 from an unlocked position, away from the post 20, to a locked position in which the lock element 70 is disposed against the post 20. This is as illustrated in FIG. 6.

Thus, when the lock element 70 engages the post 22, the sleeve 30 is accordingly locked to the post 20. This provides a double lock, not relying solely on the cooperating ratchet elements of the ratchet assembly 50 to hold the sleeve 30, and accordingly the load 2 secured to the sleeve 30, in place on the post 20.

In use, with the sleeves 30 and 100 disposed at their lower position, the load support elements 34 and 104 may be disposed on the floor or ground, etc., and the units 12 and 82 will be spaced apart to receive the load. The load 2 may then be loaded onto the load support elements and secured by the straps 44, 114, and 46, 116 to the dolly units or sections 12 and 82. The dolly units or sections 12 and 82 thus become the dolly apparatus 10. If the load 2 is relatively light, but merely bulky, then two individuals may grasp the handles 38, 42 and 108, 112, to move the dolly apparatus 10, with the load 2 secured thereto, to a desired location. The desired location, for example, may be adjacent to a hoist for lifting the dolly apparatus 10 and the load 2 onto the pitched roof of a structure.

When the hoist (not shown) lifts the dolly apparatus 10 and the load 2 to the desired location on a pitches surface, such as a pitched roof, the ratchet elements 50 and 120 are appropriately actuated to adjust the load 2 to a desired height, with the load 2 maintaining a level orientation. Since the ratchet assemblies 50 and 120 are independent of each other, they may both be adjusted as desired. The dolly apparatus 10 may then be moved along the pitch of a roof to position a load 2 as desired.

When the load 2 is in its desired position, the ratchet assemblies 50 and 120 are appropriately actuated to lower the load 2 to its desired location on a pitched roof.

For a heavier load, and one that is not capable of being easily carried or transported, or where it is desired to move a load in two directions on a pitched roof, dolly apparatus 200 may be utilized. FIG. 7 is a perspective view of dolly apparatus 200 with a load 4 secured thereto. FIG. 8 is a side view of the dolly apparatus 200 with the load 4 disposed thereon and illustrating some of the functioning of the apparatus. The dolly apparatus 200 includes four independent dolly units, including a dolly unit 202, a dolly unit 302, a dolly unit 402, and a dolly unit 502. The dolly units 202, 302, 402, and 502 are substantially identical, but are mirror images of each other, as are the dolly units 12 and 82, discussed above. FIG. 9 is a perspective view of the dolly units 402 and 502. The dolly units 202 and 302 are paired together to comprise a single dolly section, as are the dolly units 402 and 502. For the following discussion of the dolly apparatus 200, reference will primarily be made to FIGS. 7, 8, and 9.

Dolly apparatus 200 includes four separate dolly or jack units with a pair tied together to comprise a dolly section, as stated above. That is, there are four wheels, and each wheel is coupled to a jack or dolly unit, and two wheels are tied together to comprise a dolly section, or one half of the dolly apparatus 200. The load 4 is in turn disposed on the four units and maintained in a level orientation by adjusting the jacks. The jacks include ratchet elements, as discussed above for the dolly apparatus 10. The wheels of the units may be rotated ninety degrees so as to move the load 4 in two directions.

The dolly units include a first dolly unit 202, a second dolly unit 302, a third dolly unit 402, and a fourth dolly unit 502. The units are substantially identical, as indicated.

The first dolly unit 202 includes a load support bracket or platform 204 on which the load 4 is disposed. The platform 204 comprises a plate which is in turn secured to a vertically extending corner post 206. The corner post 206 is essentially an angle iron element which receives one corner of the load 4.

Extending outwardly from the corner post 206 are two horizontal arms, including a lower horizontal arm 208 and an upper horizontal arm 210. The arms 208 and 210 extend to and are appropriately secured to a sleeve 212.

Within the sleeve 212 is a vertical post 222. The vertical post 222 is secured to a bottom plate 220. As shown in FIG. 7, the upper horizontal arm 208 and the bottom of the sleeve 212 are disposed on the plate 220 when the first dolly unit 202 is in its bottom or lowermost position.

The vertical post 222 includes a plurality of ratchet elements 224. A ratchet assembly 230 is appropriately secured to the sleeve 212. The ratchet assembly 230 includes a handle 232 and a reversing lever 234. The ratchet assembly 230 cooperates with the ratchet elements 224 to move the sleeve 212, and its associated elements, vertically with respect to the plate 220 and the post 222.

Disposed beneath the plate 220 is a wheel plate 240. Extending outwardly from the wheel plate 240 is a towing flange 242. A tow bar connector 244 is in turn secured to the towing flange 242.

Extending downwardly from the wheel plate 240 is a wheel bracket 246. The wheel bracket 246 is essentially an inverted U-shaped element. A wheel 248 is journaled for rotation within the wheel bracket 246.

The dolly unit 202 is paired with the second dolly unit 302. The dolly unit 302 includes a load support bracket or platform 304 which is generally parallel to the platform 204. Secured to and extending upwardly from the platform 304 is a corner post 306. A pair of arms extend generally horizontally relative to the corner post 306. They include a lower horizontal arm 308 and an upper horizontal arm 310. A sleeve 312 is secured to the horizontal arms 308 and 310.

Extending through the sleeve 312 is a vertical post 322. The vertical post 322 is appropriately secured to a plate 320. The vertical post 322 includes a plurality of ratchet elements 324.

A ratchet assembly 330 is secured to the sleeve 312 and disposed about the post 322. The ratchet assembly 330 includes a handle 332 and a reversing lever 334.

Beneath the plate 320 is a wheel plate 340. The wheel plate 340 includes a towing flange 342 to which is secured a tow bar connector 344.

Secured to the wheel plate 340, and extending downwardly from, is a wheel bracket 346. A wheel 348 is journaled for rotation in the wheel bracket 346.

Each of the wheels of the dolly apparatus 200 includes a brake assembly, and the brake assembly includes generally three elements. The elements include a brake arm, a brake rod, and a brake element secured to the brake rod. A brake arm 350 is shown in FIG. 7 for the wheel 348. A brake assembly will be discussed in more detail, below, in conjunction with FIGS. 11 and 12.

A tow bar 360 is shown in FIG. 7 secured to and extending outwardly from the tow bar connector 344.

The first dolly unit 202 is connected to the second dolly unit 302 by telescoping elements or cross members. They include a lower outer cross member 260, which comprises a length of generally square tubing which is appropriately pinned to the flange 242. A lower central cross member 262 extends telescopingly into the cross member 260. The cross members 260 and 262 are secured together by a screw 264. A lower inner cross member 266 extends into the central cross member 262 and is secured therein by a screw 268. The free end of the inner cross member 266 is pinned to the flange 342.

An upper outer cross member 370 is secured to the sleeve 212. The cross member 370 also comprises a predetermined length of generally square tubing. Disposed within the cross member 370 is a central cross member 372. The cross member 372 is secured to the cross member 370 by a screw 374. An upper inner cross member 376 is secured to the sleeve 312. The inner cross member 376 telescopes within the member 372 and is secured therein by a screw 378.

The units 202 and 302 each include a handle. A handle 214 is shown in FIG. 7 secured to the corner post 206 and to the cross member 370. A handle 314 is shown secured to the corner post 306 and the cross member 376. The handles 214 and 314 allow the dolly and the load 4 to be lifted or carried, as desired, or as required, in certain movements.

The dolly units 402 and 502 are substantially identical to, but are mirror images of, the dolly units 202 and 302, respectively. The dolly units 402 and 502 are best shown in FIG. 9, which comprises a perspective view of the dolly units 402 and 502. For the following discussion of the dolly units 402 and 502, reference will primarily be directed to FIG. 9, although reference may also be made to FIGS. 7 and 8.

The dolly unit 402 includes a load support bracket or platform 404 to which is secured a corner post 406. Also secured to the corner post 406 are two horizontal arms, a lower arm 408 and an upper arm 410. The arms 408 and 410 extend to a sleeve 412. A handle 414 is also secured to the corner post 406 and to the arm 410 and the sleeve 412 for strength purposes.

A vertical post 422 extends through the sleeve 412 and is appropriately secured to the bottom plate 420. The vertical post 422 includes a plurality of ratchet elements, not shown. A pin 426 secures the plate 420 to a wheel plate 440. This will be described in detail below.

A ratchet assembly 430 is also secured to the sleeve 412 and cooperates with the ratchet elements on the vertical post 422. The ratchet assembly includes a handle 432 and a reversing lever 434, as is well known and understood.

The wheel plate 440 includes a towing flange 442 which extends outwardly from the plate 440. A tow bar connector 444 is appropriately secured to the top of the towing flange 442. A wheel bracket 446 is also secured to the plate 440 beneath the plate. A wheel 448 is appropriately journaled for rotation in the bracket 446. The plates 420 and 440 are pinned together by a pin 426.

The wheel 448 includes a brake assembly, which includes a brake arm 450 extending from a brake rod 452. The rod 452 is appropriately secured to the bracket 446. A brake plate 454 is secured to the rod 452. Movement of the arm 450 pivots the rod 452 to move the brake plate 454 into and out of engagement with the wheel 448.

A tow bar 460 is shown in FIG. 9 secured to the tow bar connector 444. The tow bar 460 includes a handle 462.

The fourth dolly unit 502 includes a bottom load support bracket or platform plate 504 to which is secured a corner post 506. Also secured to the corner post 506 are two horizontal arms, a lower arm 508 and an upper arm 510. The arms 508 and 510 extend from the post 506 to a sleeve 512. A handle 514 is also secured to the sleeve 512 and to the arm 510 and the post 506.

A vertical post 522 extends through the sleeve 512. The post 522 is secured to a bottom plate 520. The post 522 includes a plurality of ratchet elements, not shown. A ratchet assembly 530, appropriately secured to the sleeve 512, causes the post 506 and the platform 504, and any load secured thereto, to move vertically relative to the plate 520 and to the post 522. The ratchet assembly 530 includes a handle 532 and a reversing lever 534.

Beneath the plate 520, and appropriately journaled for relative movement thereon, is a wheel plate 540. Extending outwardly from the plate 540 is a towing flange 542. A tow bar connector 544 is secured to the flange 542. A wheel bracket 546 extends to and is disposed beneath the plate 540. A wheel 548 is journaled for rotation in the bracket 546.

The plates 520 and 540 are pinned together by a pin 526. Details of the pinning arrangements between the various bottom plates 220,320,420, and 520, and the respective wheel plates 240, 340, 440, and 540, will be explained below in conjunction with FIGS. 13, 14, and 15.

Details of the braking arrangement for locking each of the four wheels 248, 348, 448, and 548, will be explained in conjunction with FIGS. 10, 11, and 12. The brake assemblies are substantially identical, and accordingly only the brake assembly for the wheel 548 is illustrated in FIGS. 10, 11, and 12.

FIG. 10 is an enlarged front view of the wheel 548, its wheel bracket 546, the plates 540 and 520, the pin 526, and related elements. The brake arm 550 is shown secured to and extending outwardly from the brake rod 552. The brake rod 552 is journaled for movement in the bracket 546. The brake plate 554 is shown extending from the rod 552.

In FIGS. 10 and 11 the brake plate 554 is shown moved away from the wheel 548. In FIG. 12 the brake arm 550 has been pivoted downwardly, as indicated by the large arrow in FIG. 12. The brake plate 554 is shown contacting the wheel 548 to lock the wheel 548 in place.

The joining or securing together of the dolly units 402 and 502 is similarly substantially the same as that for the units 202 and 302. The joining together utilizes telescoping members, including a lower outer member 470 appropriately pinned to the flange 542. A lower central member 472 telescopes into the outer member 470. The two members 470 and 472 are secured in place relative to each other by means of a screw 474. A lower inner member 476 is appropriately pinned at one end to the flange 442 and extends into the central member 472 and is secured therein by a screw 478.

An upper outer member 480 is appropriately secured to the sleeve 512. An upper central member 482 telescopes into the outer member 480 and is secured therein by a screw 484. An upper inner member 486 is appropriately secured to the sleeve 412 and telescopes into the central member 482 and is secured therein by a screw 488.

The distance between the units 202 and 302 and the units 402 and 502 may be varied by adjusting the telescoping members, as indicated by the large arrow in FIG. 9.

The load 4 is secured to the four dolly units by means of a strap 570. That is, each of the dolly units carries a portion of the load on the several load support platforms or platform plates secured to the corner posts. The platforms comprise load support brackets for supporting the load 4, and the load 4 is secured by a strap 570.

With the load 4 disposed on the platform plates 204, 304, 404, and 504, and disposed against the inside corners of the angle iron corner posts 206, 306, 406, and 506, the load 4 is appropriately secured to the posts by means of the strap 570.

The various screws for the telescoping members are, of course, loosened while the load 4 is being positioned on the platform plates, and the screws are then tightened to secure the telescoping members together to lock the dolly units 202 and 302 together, and the dolly units 402 and 502 together.

By means of the various tow bars, the dolly apparatus 200, with the load 4 disposed thereon and secured thereto, may be moved as desired. When the dolly apparatus 200 is placed on a pitched roof, the appropriate ratchet assemblies are actuated to adjust the dolly units so that the load 4 remains vertical. The lower cross members are pinned to their respective flanges so that they may move or articulate as required during the jacking process to allow for differences in height between the respective wheels and associated elements.

The wheels may be adjusted ninety degrees so that the dolly apparatus 200 may move in either of two directions, as desired. The pivoting of the wheels is illustrated in FIGS. 13, 14, and 15.

FIG. 13 is a top view of portions of the dolly units 202 and 302. FIG. 13 also illustrates the securing together of the dolly units 202 and 302 by the various telescoping members.

The lower telescoping members 260, 262, and 266, as pinned to the respective flanges 242 and 342, and secured with the screws 264 and 268 are shown, as are the fixed telescoping members 370, 372, and 376, with their respective screws 374 and 378. The large arrows indicate the widening of the distance between the two units by the telescoping members to accommodate loads of various widths.

Since all four wheels, with their wheel plates, are pivotable or movable relative to the bottom plates, only the elements associated with the wheel 348 are illustrated in FIGS. 14 and 15. Both wheels 248 and 348, and their associated elements, are shown in FIG. 13. For the following discussion, reference will primarily be made to FIGS. 13,f 14, and 15.

The plates 240 and 340 each include two holes which may receive the respective pins 226 and 326. In FIG. 13, two holes 341 and 343 are shown in phantom for the plate 340.

For moving the wheels 248 and 348 away from their alignment illustrated in FIG. 7, the pins 226 and 326 are lifted to move the pins out of the holes in the plates 240 and 340, respectively. The wheels 248 and 348 may then be moved, as illustrated by the dash dot arrows in FIG. 13. When the wheels are moved to the position shown in FIG. 14, the pins 226 and 326 move into the second hole, such as the hole 343 for the pin 326, to lock the wheels in the new orientation. In FIG. 14, the wheel 348 is shown disposed substantially perpendicularly to the horizontal arm 310. The pin 326 is then locked in the hole 343 to maintain the wheel 348 in the alignment as shown.

In FIG. 15, the wheel 348 is shown moved back to the orientation illustrated in FIG. 7 and in FIG. 8.

Referring again to FIGS. 10, 11, and 12, the pin 526 is shown extending through the plate 520 and into the plate 540 to maintain the alignment of the wheel 548 as illustrated.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Variable pitch dolly apparatus for moving a load on a pitched surface while maintaining the load in a level orientation comprising in combination:

a first dolly unit, including
  a first platform for receiving and supporting a park of the load,
  a first post secured to the first platform,
  a first sleeve secured to the first post,
  a first fixed post extending through the first sleeve,
  a first wheel secured to the first fixed post, and
  means for moving the first sleeve, with the first post and first platform secured to the first sleeve, on the first fixed post;

a second dolly unit, including
  a second platform for receiving and supporting a part of the load,
  a second post secured to the second platform,
  a second sleeve secured to the second post,
  a second fixed post extending through the second sleeve,
  a second wheel secured to the second fixed post, and
  means for moving the second sleeve, with the second post and second platform secured to the second sleeve, on the second fixed post;

first articulated means for securing the first dolly unit to the second dolly unit to allow the first and second dolly units to be at different heights on the pitched surface;

a third dolly unit, including
  a third platform for receiving and supporting a part of the load,
  a third post secured to the third platform,
  a third sleeve secured to the third post,
  a third fixed post extending through the third sleeve,
  a third wheel secured to the third fixed post, and
  means for moving the third sleeve, with the third post and third platform secured to the third sleeve, on the third fixed post; and a fourth dolly unit, including
  a fourth platform for receiving and supporting a part of the load,
  a fourth post secured to the fourth platform,
  a fourth sleeve secured to the fourth post,
  a fourth fixed post extending through the fourth sleeve,
  a fourth wheel secured to the fourth fixed post, and
  means for moving the fourth sleeve, with the fourth post and fourth platform secured to the fourth sleeve, on the fourth fixed post;

second articulated means for securing the third dolly unit to the fourth dolly unit to allow the third and fourth dolly units to be at different height on the pitched surface;

whereby the load disposed on the first, second, third, and fourth platforms is maintained in a level orientation by raising the desired platforms to level the load as the first, second, third, and fourth dolly units are moved on a pitched surface; and means for securing the load to the first, second, third, and fourth platforms.

2. The apparatus of claim 1 in which the first, second, third, and fourth wheels are pivotally secured to the respective first, second, third, and fourth fixed posts for moving the load in two directions.

3. The apparatus of claim 1 which further includes
  first means for securing together the first and second platforms to align the first and second platforms, and
  second means for securing together the third and fourth platforms to align the third and fourth platforms.

4. The apparatus of claim 3 in which the first means for securing together the first and second platforms, and the second means for securing together the third and fourth platforms, each include telescoping members for varying the respective distances between the first and second platforms and between the third and fourth platforms.

5. The apparatus of claim 4 which further includes third means for securing together the first and second fixed posts, and fourth means for securing together the third and fourth fixed posts.

6. The apparatus of claim 5 in which the third and fourth means for securing together the first and second fixed posts and the third and fourth fixed posts, respectively, each include telescoping members for varying the distances between the respective first and second fixed posts and the third and fourth fixed posts.

7. The apparatus of claim 1 in which the means for securing the load to the first, second, third, and fourth platforms comprises a strap for securing the load to the first, second, third, and fourth posts.

8. The apparatus of claim 7 which further includes handles for manually lifting the first, second, third, and fourth dolly units.

9. The apparatus of claim 1 which further includes brake assemblies secured to the respective first, second, third, and fourth wheels to lock the wheels.

10. The apparatus of claim 1 in which the means for moving the respective sleeves on the respective fixed posts includes cooperating ratchet elements on the sleeves and posts.

11. The apparatus of claim 1 which further includes means for locking the first, second, third, and fourth wheel in two positions substantially ninety degrees apart for movement of the load in a desired direction on the pitched surface.

12. Dolly apparatus for moving a load on a pitched surface comprising in combination:
  first wheel means movable on the pitched surface;
  first platform means supported by the first wheel means and movable vertically relative to the first wheel means for supporting a part of the load;
  second wheel means movable on the pitched surface;
  second platform means supported by the second wheel means and movable vertically relative to the second wheel means for supporting a part of the load;
  first articulated means for securing the first and second wheel means together to allow the first and second wheel means to be at different heights on the pitched surface;
  third wheel means movable on the pitched surface;
  third platform means supported by the third wheel means and movable vertically relative to the third wheel means for supporting a part of the load;
  fourth wheel means movable on the pitched surface;
  fourth platform means supported by the fourth wheel means and movable vertically relative to the fourth wheel means for supporting a part of the load;

second articulated means for securing together the third and fourth wheel means to allow the third and fourth wheel means to be at different heights on the pitched surface;

means for securing the load to the first, second, third and fourth platform means and thereby securing the first and second wheel means to the third and fourth wheel means; and means for moving the first, second, third, and fourth platform means vertically to level the load thereon.

13. The apparatus of claim 12 in which each wheel means includes a fixed post and each platform means includes a sleeve movable on the fixed post and a platform secured to the sleeve.

14. The apparatus of claim 13 in which the means for moving the platform means includes means for moving the sleeves on the fixed posts.

* * * * *